Feb. 21, 1967   J. P. FRANCIS   3,304,996
FRAME SUPPORTING MEANS FOR AUTOMOBILE WINDSHIELD AWNING
Filed Dec. 24, 1964
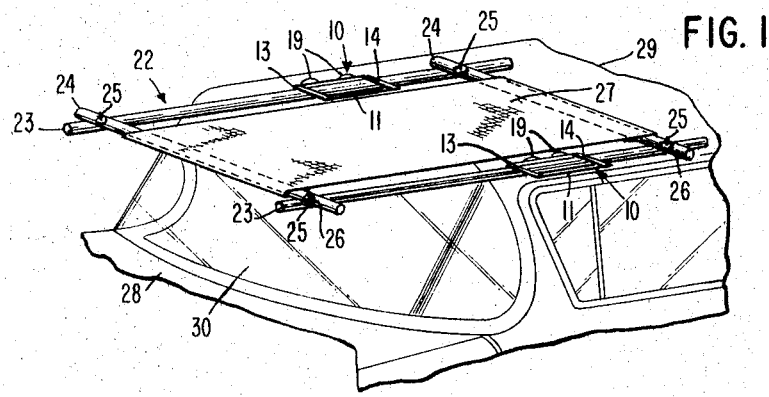
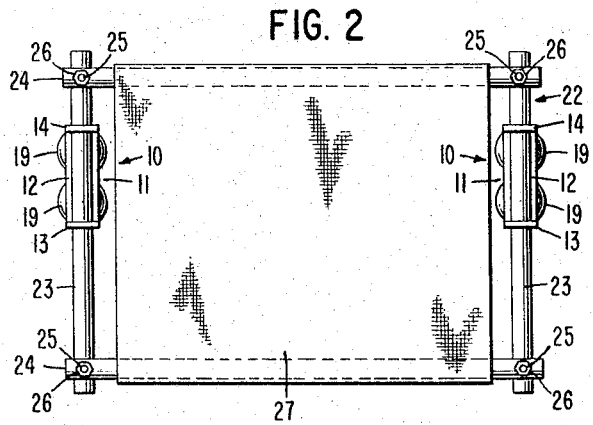
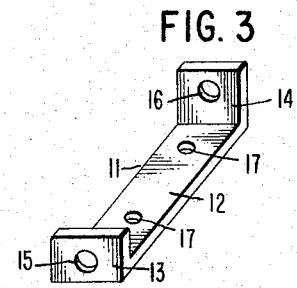
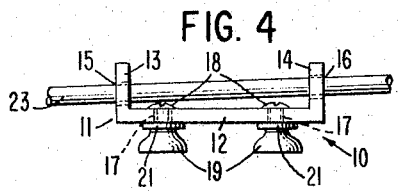
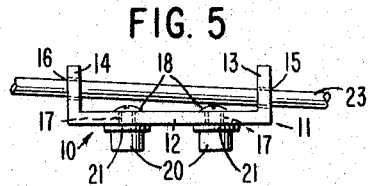
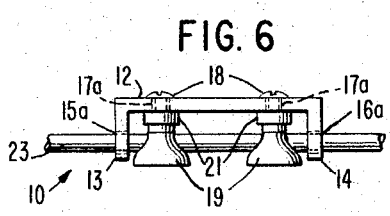
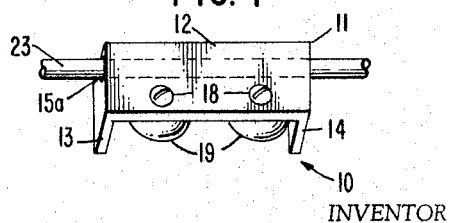
INVENTOR
John P. Francis

United States Patent Office 3,304,996
Patented Feb. 21, 1967

3,304,996
FRAME SUPPORTING MEANS FOR AUTOMOBILE WINDSHIELD AWNING
John P. Francis, 20 Boston St.,
Haverhill, Mass. 01830
Filed Dec. 24, 1964, Ser. No. 420,880
4 Claims. (Cl. 160—369)

This is a continuation-in-part of application Serial No. 352,707, filed February 11, 1964, now Patent No. 3,174,536. My invention therefore, is concerned primarily with the simplified and improved form of frame supporting means for adjustably supporting an awning structure over the roof top of an automobile.

This invention relates to improvements in the supporting means for supporting a retractable awning structure over the windshield area and the roof top of an automobile, an object thereof being to provide a very simple and an improved awning or frame supporting means adapted to adjustably engage the exterior portion of the roof top of said automobile.

Another object thereof is to provide a permanent, semipermanent, or a temporary and removable roof engaging awning supporting means capable of also supporting the awning in a like manner of attachment.

A still further object thereof is to provide an awning capable of being movably supported for retractable adjustment, and adapted to be supported in spaced apart or in close proximity relative to and over the roof top of the automobile.

A still further and important object thereof is to provide weather protection to the windshield area from rain, sleet, snow, or the formation of ice thereon, and to provide clean and clear visibility for proper vision at all times when viewing outdoor movies at drive-in theatres and other outdoor events, thereby eliminating the continuous or the on and off use of the windshield wipers.

With these objects and still others in view, as will hereinafter more fully appear, the invention comprises certain novel constructions, combination and arrangement of parts, hereinafter described and claimed and illustrated in the accompanying drawings, in which:

FIGURE 1 is a perspective view, in fragment, of the front portion of an automobile, the view including a perspective view of the awning and the supporting means for supporting the awning frame structure and said awning.

FIGURE 2 is a top plan view of the awning shown attached to the awning frame structure and supported by the frame supporting means.

FIGURE 3 is a perspective view of a substantially U-shaped frame supporting member showing the longitudinally aligned apertures thereon.

FIGURE 4 is a side elevation view of the awning or frame supporting means shown supporting a side longitudinal frame member at an angle thereto.

FIGURE 5 is a side elevation view of a modified form of awning or frame supporting means shown reversed and supporting a side longitudinal frame member in a reversed angle to that of FIGURE 4.

FIGURE 6 is a side elevation view of a modified form of a frame supporting member shown supported in a reversed downward position; and FIGURE 7 is a perspective view of FIGURE 6 showing the laterally opposed awning side frame member and the vacuum cups supported to the frame supporting member.

Referring now more specifically to the drawings, attention is directed primarily to FIGURES 1 and 2, wherein numeral 10 generally designates the awning or frame supporting means and numeral 22 generally designates the frame structure supported above the frame supporting means.

In FIGURE 1, a portion of an automobile 28 is shown with the awning 27, which is made of flexible or rigid material, being supported by the frame structure 22 over the roof top 29 and the windshield area 30, and adjustably supported for longitudinal and angular adjustment of said awning.

To adjustably support the frame structure 22, first, the frame supporting means 10 are either removably or permanently attached to the roof top 29 at the desired location, laterally and longitudinally. The frame supporting means 10 may be positioned in a longitudinally reversed position, or, in a reversed vertical position, as may be noted from FIGURES 2, 4, 5 and 6.

The awning or frame supporting means 10, FIGURE 4, has a longitudinally disposed frame supporting member 11 in the form of an elongated flat U-shaped member. The supporting member 11 is provided with a forward vertical flat portion 13 and a spaced apart rear vertical flat portion 14 to adjustably support a retractable side longitudinal frame member 23 to the said spaced apart vertical members 13 and 14. Longitudinally spaced apart vacuum cups 19 are shown attached to the underside of the horizontal flat portion 12 by the threaded bolt members 18.

In FIGURE 3, the frame supporting member 11 is shown without the roof engaging means. In the forward vertical flat portion 13 a frame engaging aperture 15 is provided. In the rear vertical flat portion 14 a frame engaging aperture 16 is provided at a higher level than the forward aperture 15, thus providing for the angular positioning of the frame structure 22. The bolt engaging apertures 17 on the horizontal flat portion 12 are in line longitudinally with the apertures 15 and 16.

In FIGURE 5, the U-shaped frame supporting member 11 is shown in a reversed 180 degree position with the side longitudinal frame member 23 supported in a reversed angular position relative to FIGURE 4. The frame supporting member 11, FIGURE 5, is shown supported by a modified form of roof engaging means comprising magnetized metal blocks 20 attached by the threaded bolt members 18.

A modified form of the frame supporting means 10 is shown in both FIGURES 6 and 7. In FIGURE 6, the U-shaped frame supporting member 11 is shown supported in a reversed or downward position on the roof engaging means comprising the vacuum cups 19. The removable spacer members 21, which are optional, may be used to raise the frame supporting member 11 at a higher level, or at a longitudinally angular position upon the removal of one of the spacer members 21, with the spacer members 21 also shown in FIGURES 4 and 5. The side longitudinal frame member 23 is shown supported through the frame engaging aperture 15a of vertical portion 13, and frame engaging aperture 16a of vertical portion 14, and shown supported parallel with the upper horizontal flat portion 12 and spaced laterally from the vacuum cups 19 engaged by bolts 18 in the apertures 17a.

In FIGURE 7, a perspective view of FIGURE 6, there is shown the laterally spaced arrangement of the vacuum cups 19 and the side longitudinal frame member 23 to enable the said frame member 23 to be supported in close proximity to the roof top upon the said reversed positioning of the frame supporting member 11.

Referring back to FIGURE 2, the retractable frame structure 22 comprises, mainly, the opposing longitudinal tubular side frame members 23 adapted to adjustably engage the vertical flat portions 13 and 14 of the frame supporting members 11. Forward and rear lateral tubular frame members 24 are attached to the said side frame members 23 by each of the four corner engaging vertical bolt 25 and nut 26 members, as shown. The frame structure 22 and the attached awning structure 27, as shown and described, may be of other structural changes and modifications well known in the art, and adjustably supported in a like manner by the frame supporting means 10 for the numerous and various positions of awning support.

The frame supporting means 10, FIGURES 2, 4, 5 and 6, in addition to the retractable movement of the awning frame structure 22, provides longitudinally angular positioning either forwardly or rearwardly, of the said frame structure 22. The entire frame structure 22 is also adapted to be supported in close proximity to the roof top, and is also capable of being supported so that the rear lateral frame member engages the lateral portion of the roof top in lateral frictional engagement therewith. The awning 27 may therefore be supported in a longitudinally angular or horizontally positioned and vertically spaced apart relationship, or, in lateral frictional or rain sealing engagement with the roof top.

It is quite obvious that the device may be erected for similar use over the rear window of a station wagon or other type of automobile. The device is also adapted to be erected over a side window, for use in a drive-in restaurant, during inclement weather or for protection from the sun.

The frame structure 22 with the attached awning 27 may be of any longitudinal length to cover and protect the windshield area and a large portion of the roof top. Thus, when partially retracted, the entire roof may be protected from the glare of the sun or from any deposits falling thereon.

Since the device is used in a drive-in theatre, while viewing outdoor movies or the like, windshield weather protection is provided during inclement weather conditions. Eliminated is the on and off or the continuous automobile engine noise, or windshield wiper noise or blur, or wiper or engine noise caused by the automobile or the adjacent parked automobiles in a drive-in theatre, or in other types of drive-in facilities.

While certain embodiments of my invention have been disclosed in the foregoing description, it will be understood that various modifications may occur to those skilled in the art. Changes, therefore, in the construction and arrangement, may be made without departing from the spirit and scope of the invention as disclosed in the appended claims.

I claim:

1. An adjustable automobile awning frame supporting means for adjustably supporting a removably attached windshield awning and frame structure, comprising a side longitudinally disposed frame supporting member for supporting in angularly and longitudinally movable adjustment thereto a removably attached side longitudinal frame member of said frame structure, said longitudinally disposed frame supporting member having a horizontally disposed flat portion provided with bolt engaging apertures, a vertically disposed flat portion at one end provided with an awning frame engaging aperture, a longitudinally spaced apart vertically disposed flat portion at the opposite end and provided with an awning frame engaging aperture positioned at a dissimilar height from the aperture on said one end, said frame supporting member adjustably supporting the said awning frame member through the said longitudinally spaced apart apertures of the said vertically disposed flat portions and in an angular and vertically spaced apart relationship relative to the horizontally disposed flat portion of said frame supporting member, threaded bolt members extending through the said bolt engaging apertures, and roof engaging means threadably engaging the said threaded bolt members in securing said frame supporting member to said roof engaging means, said adjustable frame supporting member adapted to be preattached to the roof top to adjustably support the attachable awning and frame structure in lateral frictional engagement with the roof top or in adjustable longitudinally angular or horizontally positioned spaced apart relationship relative to the roof top and the windshield area of the automobile depending upon the longitudinal location of the said vertically disposed flat portion having the said lower aperture, either forwardly or rearwardly, upon the selected forward or the reversed preattached positioning of the said frame supporting member.

2. An adjustable automobile awning frame supporting means for adjustably supporting a removably attached windshield awning and frame structure, comprising an elongated substantially U-shaped longitudinally disposed frame supporting member having longitudinally spaced apart vertically disposed end portions for supporting in longitudinally movable adjustment thereto a removably attached side longitudinal frame member of said frame structure, said frame supporting member being provided with an awning frame engaging aperture laterally positioned off to one side on each of said end portions, the horizontally disposed portion of the said U-shaped member being provided with bolt engaging apertures laterally positioned off to one side thereof opposite to the said first mentioned apertures, said U-shaped frame supporting member adapted to be supported in an upright position or in a reversed downwardly position, said U-shaped frame supporting member adjustably supporting off to one side thereof the said awning frame member through the said longitudinally spaced apart apertures of the said vertically disposed end portions and in a vertically spaced apart relationship relative to the said horizontally disposed portion of said U-shaped frame supporting member, threaded bolt members extending through the said bolt engaging apertures, and roof engaging means threadably engaging the said threaded bolt members in securing the said U-shaped frame supporting member to said roof engaging means, said adjustable U-shaped frame supporting member adapted to be preattached to the roof top to adjustably support the attachable awning and frame structure in lateral frictional engagement and in longitudinal proximity with the roof top or in adjustable longitudinally or horizontally positioned spaced apart relationship relative to the roof top and the windshield area of the automobile depending upon the vertical positioning of the said U-shaped frame supporting member, either vertically upright or reversed downwardly, upon the selected preattached positioning of the said U-shaped frame supporting member on the roof engaging means.

3. An adjustable automobile awning frame supporting means as claimed in claim 1, and further including a removably attached spacer member freely engaged on either one of the said longitudinally spaced apart vertical bolt members, said spacer member freely and frictionally engaging the said roof engaging means of the said engaged vertical bolt member and engaging the underside of one end of the said frame supporting member to provide longitudinally angular adjustment of the said longitudinally disposed frame supporting member.

4. An adjustable automobile awning frame supporting means as claimed in claim 2, and further including a removably attached spacer member freely engaged on either one of the said longitudinally spaced apart vertical bolt members, said spacer member freely and frictionally engaging the said roof engaging means of the said engaged vertical bolt member and engaging the underside of one end of the said U-shaped frame supporting member to provide longitudinally angular adjustment of the said longitudinally disposed U-shaped frame supporting member.

References Cited by the Examiner

UNITED STATES PATENTS

| 1,468,197 | 9/1923 | Downing | 248—206 |
| 1,540,959 | 6/1925 | Schumacker | 248—314 |
| 3,131,755 | 5/1964 | Francis | 160—369 |

HARRISON R. MOSELEY, *Primary Examiner*.

P. C. KANNAN, *Assistant Examiner*.